US012032997B2

(12) United States Patent
Evans et al.

(10) Patent No.: US 12,032,997 B2
(45) Date of Patent: Jul. 9, 2024

(54) REDUCING INTERRUPTS USING BUFFERING FOR DATA PROCESSING

(71) Applicant: Microsoft Technology Licensing, LLC, Redmond, WA (US)

(72) Inventors: Glenn F. Evans, Kirkland, WA (US); Yue Jiang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/746,878

(22) Filed: May 17, 2022

(65) Prior Publication Data

US 2023/0244621 A1 Aug. 3, 2023

Related U.S. Application Data

(60) Provisional application No. 63/300,045, filed on Jan. 16, 2022.

(51) Int. Cl.
*G06F 9/48* (2006.01)
*G06F 13/24* (2006.01)
*H04L 49/9047* (2022.01)

(52) U.S. Cl.
CPC .......... *G06F 9/4887* (2013.01); *G06F 9/4812* (2013.01); *G06F 9/4893* (2013.01); *G06F 13/24* (2013.01); *H04L 49/9047* (2013.01)

(58) Field of Classification Search
CPC ...... G06F 13/24; G06F 9/4812; G06F 9/4887; G06F 9/4893; H04L 49/9047
See application file for complete search history.

(56) References Cited

U.S. PATENT DOCUMENTS 6,212,593 B1    4/2001 Pham et al.
8,769,533 B2    7/2014 North
(Continued)

FOREIGN PATENT DOCUMENTS

CN    111708288 A    9/2020

OTHER PUBLICATIONS

Chung, et al., "An Efficient TCP/IP Offload Embedded System with Deterministic Buffering Processes", In Proceedings of IEEE International Symposium on Object/Component/Service-Oriented Real-Time Distributed Computing, Mar. 17, 2009, pp. 211-215.
(Continued)

*Primary Examiner* — Glenn A. Auve
(74) *Attorney, Agent, or Firm* — Wade IP Law PLLC

(57) ABSTRACT

Techniques are described herein that are capable of reducing interrupts using buffering for data processing. In a first example, information is received at an operating system from an application. The information indicates multiple buffers, including a triggering buffer to trigger an interrupt from hardware. Portions of the data are stored in the respective buffers. A schedule for processing the buffers is provided to the hardware. The schedule indicates that the interrupt is to be delayed until the triggering buffer is processed by the hardware. In a second example, a network interface controller is configured to provide one interrupt to the operating system for each of multiple subsets of network packets that is processed by the network interface controller. Each subset includes a number of the network packets that is greater than one. The network packets are associated with a common network socket.

20 Claims, 8 Drawing Sheets

(56) References Cited

U.S. PATENT DOCUMENTS

| | | | |
|---|---|---|---|
| 9,563,431 B2 | 2/2017 | Tamir et al. | |
| 10,958,597 B2 | 3/2021 | Suresh et al. | |
| 11,164,496 B2 | 11/2021 | Malnar | |
| 2013/0151743 A1* | 6/2013 | Isrel, Jr. | H04L 49/90 710/261 |
| 2014/0006667 A1* | 1/2014 | Sun | H04L 47/41 710/261 |
| 2014/0095752 A1* | 4/2014 | Cheshire | G06F 13/24 710/262 |
| 2015/0134867 A1 | 5/2015 | Hildner | |
| 2015/0212564 A1* | 7/2015 | Min | G06F 1/3278 713/320 |
| 2015/0286594 A1* | 10/2015 | Degani | G06F 13/4234 710/261 |
| 2017/0344277 A1* | 11/2017 | Gilboa | G06F 13/24 |
| 2020/0412655 A1 | 12/2020 | Thyagaturu et al. | |
| 2021/0041929 A1* | 2/2021 | Connor | H04L 12/10 |

OTHER PUBLICATIONS

"Interrupt Moderation", Retrieved From: https://docs.microsoft.com/en-us/windows-hardware/drivers/network/interrupt-moderation, Published on: Dec. 14, 2021, 2 pages.

Barry, et al., "Modern Embedded Computing: Designing Connected, Pervasive, Media-Rich Systems", In Publication of the Elsevier, Feb. 10, 2012, 215 Pages.

"International Search Report and Written Opinion Issued in PCT Application No. PCT/US22/047961", dated Feb. 17, 2023, 15 Pages.

Wang, et al., "Reducing Power Consumption for Mobile Platforms via Adaptive Traffic Coalescing", In IEEE Journal on Selected Areas in Communications, vol. 29, Issue 8, Sep. 2011, pp. 1618-1629.

* cited by examiner

REDUCING INTERRUPTS USING BUFFERING FOR DATA PROCESSING

CROSS-REFERENCE TO RELATED APPLICATION(S)

This application claims the benefit of U.S. Provisional Application No. 63/300,045, filed Jan. 16, 2022 and entitled "Reducing Interrupts Using Buffering for Data Processing," the entirety of which is incorporated herein by reference.

BACKGROUND

Hardware typically is given a queue of memory buffers for processing data. For instance, each memory buffer may be a respective portion of memory that is used to temporarily store a portion of the data while that portion of the data is processed by the hardware. The hardware usually begins to process the memory buffers (e.g., data therein) immediately and asynchronously with regard to other hardware, which may result in excessive power consumption. The hardware traditionally issues an interrupt when processing of each memory buffer is completed. Upon receipt of each interrupt, an operating system may re-fill the corresponding memory buffer to keep the hardware active. However, receiving an interrupt for each processed memory buffer causes the operating system to consume substantial time and resources.

In an effort to reduce the amount of time and resources that are consumed by the operating system, a solution has been proposed in which the hardware issues interrupts periodically based on a fixed period. For instance, the hardware may issue an interrupt every 10 milliseconds (ms). However, issuing the interrupts periodically based on the fixed period may result in buffering underflow or irregular video and audio outputs. Buffer underflow is a state in which data in memory buffers is processed faster than the memory buffers are re-filled. Furthermore, the implications of this solution to general applications typically are unknown. For instance, many applications become inoperable if the period approaches the durations of the video and audio buffers.

SUMMARY

Various approaches are described herein for, among other things, reducing interrupts using buffering for data processing. An interrupt is a request for data from an operating system. An operating system may provide buffers to hardware, and at least one of the buffers may be designated as a triggering buffer. A triggering buffer triggers the hardware to provide an interrupt when the triggering buffer is encountered (e.g., processed) by the hardware. For instance, the hardware may delay providing an interrupt until a triggering buffer is encountered.

In a first example approach, information is received at an operating system from an application. The information indicates multiple buffers that are to be used to buffer data and further indicates a triggering buffer selected from the buffers that is to trigger an interrupt from hardware. The interrupt is configured to request more of the data from the operating system. Portions of the data are stored in the respective buffers. A schedule for processing the buffers is provided to the hardware. The schedule indicates that the interrupt is to be delayed until the triggering buffer is processed by the hardware. The interrupt is received from the hardware based at least in part on (e.g., in response to or as a result of) the triggering buffer being processed by the hardware. An action is performed based at least in part on receipt of the interrupt.

In a second example approach, a network interface controller is configured to provide one interrupt to the operating system for each of multiple subsets of network packets that is processed by the network interface controller. The network packets are associated with a common network socket. A network socket is a context that refers to a logical network connection on a computer. For instance, the network socket may be associated with an IP address and a port number. Each subset of the network packets includes a designated number of the network packets. The designated number is greater than one. Each interrupt is configured to request more of the network packets from the operating system. The one interrupt is received from the network interface controller for each subset of the network packets that is processed by the network interface controller. An action is performed based at least in part on (e.g., in response to or as a result of) receipt of a designated interrupt from the network interface controller.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
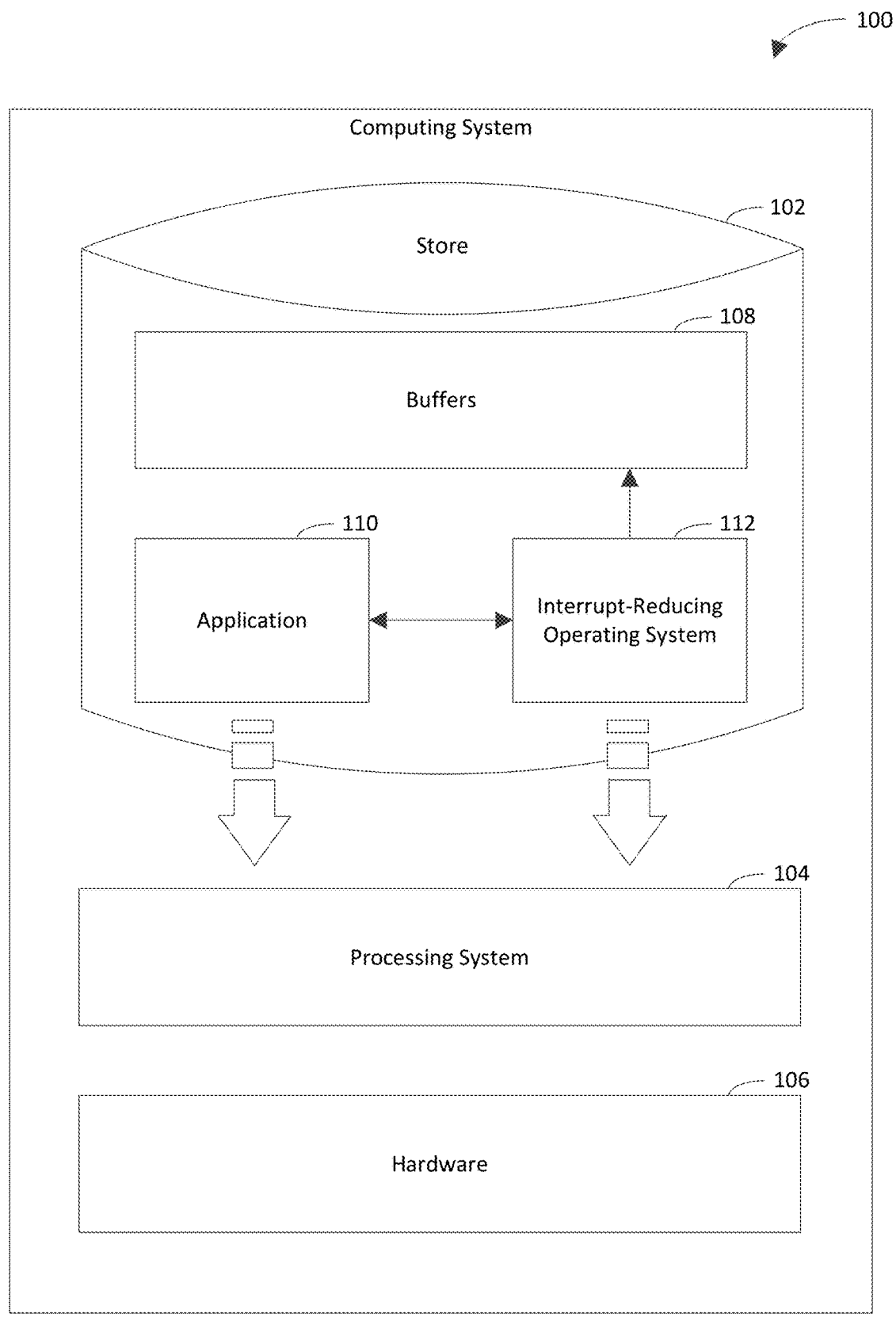
FIG. 1 is a block diagram of an example computing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

As explained above, hardware typically is given a queue of memory buffers for processing data and issues an interrupt (e.g., when processing of each memory buffer is completed or periodically) to request additional data from an operating system. However, receiving an interrupt for each processed memory buffer causes the operating system to consume substantial time and resources, and issuing interrupts periodically may result in buffering underflow or irregular video and audio outputs.

Example embodiments described herein reduce interrupts using buffering for data processing. An interrupt is a request for data from an operating system. In embodiments, an operating system provides buffers to hardware, and at least one of the buffers may be designated as a triggering buffer. A triggering buffer triggers the hardware to provide an interrupt when the triggering buffer is encountered (e.g., processed) by the hardware. For instance, the hardware may delay providing an interrupt until a triggering buffer is encountered.

Example techniques described herein have a variety of benefits as compared to conventional techniques for processing data. For instance, the example techniques enable applications to provide time constraints to avoid underflow while enabling an operating system to take advantage of available time periods to reduce power consumption. The operating system may take advantage of the available time periods by entering a sleep state or by performing other work. The example techniques are naturally scalable (e.g., pay-as-you go) and capable of being abstracted to new hardware features, application programming interfaces (APIs), and domain name system (DNS)/dynamic host configuration protocol (DHCP)/Internet Protocol (IP) address management (IPAM), also referred to as DNS/DHCP/IPAM (DDIs). Fixed quantum scheduling (e.g., periodic issuance of interrupts) can be implemented as a sub-mode of any one or more of the example techniques. Furthermore, "slackness" analysis can provide insight into which hardware components in a computing system are impacting the computing system the most or are closest to losing data when more aggressive constraints are applied to the computing system. By reducing a number of interrupts that are received by an operating system, the example techniques may reduce an amount of power that is consumed by the operating system and/or extend battery life of a computing system on which the operating system executes. Such benefits may be especially evident with regard to media consumption (e.g., video streaming).

By using temporal (e.g., deadline) information, hardware buffering, and interrupts, activity of the operating system and the hardware can be dynamically clustered to improve power efficiency of the hardware. Dynamically clustering the activity of the operating system and the hardware may enable the operating system to reduce (e.g., avoid) a substantial proportion of the interrupts, which are configured to wake the operating system, and/or may enable the hardware to align (also known as (a.k.a.) pipeline) processing of data to increase power efficiency. Further, the deadlines from each hardware block can be collected by all hardware stacks in order for global alignment of work by global (or hierarchical or distributed) alignment logic.

The example techniques also dynamically reduce a number of operating system wakes. Hardware alignment may be increased by using buffering for realtime media processing and rendering. If applications notify an operating system of the time instances at which buffer underflows will occur (a.k.a. 'buffering low watermarks'), the operating system can configure the hardware to notify the operating system when the time instances occur or when the time instances are approaching, so that underflows can be avoided.

The amount of time between the buffering low watermarks for the various hardware blocks can be leveraged to aggressively save power by running the hardware in more power efficient modes (e.g., lower frequencies), by postponing when the hardware blocks execute in order to cluster or align them, and/or by postponing notification of the operating system by moving out the next interrupt (or skipping it entirely in some cases). This can be done without impacting the ability of the computing system to meet established deadlines so that the end user is not perceivably impacted. If an operating system wakes for some other reason, the current available buffering levels can be queried so that additional buffers can be "topped off" to enable the buffering low watermark to be extended further into the future, which may avoid an interrupt entirely.

The example techniques reduce an amount of time and/or resources (e.g., processor cycles, memory, network bandwidth) that is consumed to process data. For instance, the example techniques may reduce a number of interrupts that are issued by hardware and therefore the number of wakes that are encountered by an operating system for purposes of processing the data. By reducing the number of interrupts that are issued by the hardware, the example techniques reduce an amount of time that is consumed and/or a number of operations that are performed by the hardware to process the data. By reducing the number of wakes that are encountered by the operating system, the example techniques reduce an amount of time that is consumed and/or a number of operations that are performed by the operating system to facilitate (e.g., manage) the processing of the data. Accordingly, the example techniques increase efficiency of the hardware and/or the operating system. More broadly, the example techniques reduce an amount of time and/or resources that is consumed by, and/or increase efficiency of, a computing system that includes the hardware and/or the operating system.

Further, many hardware components involved in media applications follow a similar design of hardware processing queues, including video display hardware; video decoding, encoding, and/or processing hardware; audio capture hardware; audio playback hardware; camera capture hardware; CPU core execution (e.g., timers and CPU processors); and network packet send and receive hardware. Utilizing the example techniques to reduce a number of interrupts that are issued by such hardware components reduces a likelihood of the hardware components to provide irregular video and audio outputs, as compared to conventional techniques for processing data. For instance, the example techniques may enable the hardware components to provide more stable (e.g., less jittery) outputs.

The example techniques are also more reliable and/or have a more predictable impact on the applications, as compared to the conventional techniques. For example, a multimedia class scheduler service (MMCSS) may be modified to support earliest deadline first scheduling (EDFS) integrated with power management. This may enable applications to submit CPU work requests along with deadlines so that the operating system scheduler can implement an EDFS scheduler, and perform CPU power management controls or send them to the hardware CPU controllers (known as autonomous Epp power control). The CPU timer APIs may be enhanced to allow applications to indicate wake times and tolerances, which may effectively become a form of a deadline (e.g., target time plus tolerance) indicating when the operating system is to be awakened.

For video displays, the operating system may be woken on each vertical blank period (e.g., 60 times per second, once per frame). To reduce the number of interrupts, an API/DDI feature may be implemented to relay the information to the hardware flip queue (HWFQ) infrastructure to pass a queue of buffers and specific interrupts in order. For example, an application may use a pool of eight buffers and request that the operating system and/or the application is notified when there is a low watermark of two buffers. The operating system may sleep for six buffers and let the hardware wake it with an interrupt, which avoids more than 80% of the interrupts. The APFDDI feature may be used by the application to indicate temporally when frames need to be shown so that the hardware can map the frames to buffers.

Developer experience (DX) APIs and hardware scheduling may enable applications to submit queues of work to video processing hardware and to cause interrupts to be inserted to indicate when the hardware is to provide interrupt(s) to the operating system. An additional infrastructure (referred to as goal-based power management) enables an application to indicate a time by which the work is to be completed, so that the underlying control software and hardware can vary the processing speed and times to make the hardware execute more efficiently from a power perspective. APIs and DDIs may be modified to follow a similar mode to the video display/APFDDI feature. For instance, the applications may be configured to identify at which audio buffers the operating system is to be awakened and/or to be able to add more buffers.

The operating system may provide a queue of buffers into which camera hardware is to capture its images. For instance, each buffer completion traditionally may cause an interrupt to be issued by the camera hardware. Because the capture hardware rate is known, buffering low watermark deadlines and interrupt service times (and associated operating system processing deadlines) may be computed.

Network API/DDI support for queue-based processing may be available via the Realtime network input/output (I/O) interfaces (e.g., RIO APIs and DDIs). Basic support may be available for globally controlling interrupt rates via packet counts or time, for example, using network interruption moderation. In network interrupt moderation, NIC hardware does not generate an interrupt immediately after receiving a packet. Instead, the NIC hardware waits for more packets to arrive, or for a time-out to expire, before generating an interrupt. These two techniques can be combined and enhanced to enable an application to specify when the buffering level of a particular socket reaches a buffering low watermark (e.g., rather than globally at a fixed rate).

The RIO APIs may be changed to allow an application to be woken when the receive or send buffering levels reach a specific buffer. Furthermore, if the CPU wakes for some other reason, the current levels can be queried and new buffers can be used to "top off" the queues and move the wake low watermark further into the future.

FIG. 1 is a block diagram of an example computing system 100 in accordance with an embodiment. Generally speaking, the computing system 100 operates to reduce interrupts using buffering for data processing. An example of a computing system is a system that includes a processing system comprising at least one processor that is capable of manipulating data in accordance with a set of instructions. For instance, a computing system may be a desktop computer, a laptop computer, a tablet computer, a wearable computer such as a smart watch or a head-mounted computer, a personal digital assistant, a cellular telephone, an Internet of things (IoT) device, a gaming console, or the like.

As shown in FIG. 1, the computing system 100 includes a store 102, a processing system 104, and hardware 106. The store 102 includes buffers 108, an application 110, and an interrupt-reducing operating system 112. The buffers 108 correspond to respective memory address ranges in the store 102. The buffers 108 store data that is received from the interrupt-reducing operating system 112. The application 110 is a computer program configured to assist a user of the computing system 100 perform an activity. Examples of such an activity include capturing a visual image (e.g., still picture or video), displaying a photo, playing back a video, capturing audio, and playing back audio. The application 110 is configured to execute on the processing system 104. For instance, when executed on the processing system 104, the application 110 may gather data (e.g., visual images and/or audio content) and provide the data to the interrupt-reducing operating system 112 for processing.

The processing system 104 is electronic (e.g., digital) circuitry that is configured to execute the application 110 and the interrupt-reducing operating system 112. For instance, the processing system 104 may execute instructions that are included in the application 110 and the interrupt-reducing operating system 112. The processing system 104 includes one or more processors. For example, each processor may be a central processing unit (CPU).

The hardware 106 is electronic circuitry that is configured to process the buffers 108. The hardware 106 is further configured to provide an interrupt to the interrupt-reducing operating system 112 when each triggering buffer in the buffers 108 is processed. For instance, the hardware 106 may process each triggering buffer and then provide the respective interrupt to the interrupt-reducing operating system 112. Examples of hardware include a video display; video decoding, encoding, and/or processing hardware; audio capture hardware; audio playback hardware; camera capture hardware; CPU core execution hardware (e.g., a timer, a CPU processor); and network packet send and receive hardware (e.g., a network interface controller).

The interrupt-reducing operating system 112 is an operating system that is configured to reduce interrupts using buffering for data processing. An operating system is software that controls operation of a computing system. Accordingly, the interrupt-reducing operating system 112 controls operation of the computing system 100. For instance, the interrupt-reducing operating system 112 may manage computer hardware resources (e.g., hardware 106) and/or provide services for execution of applications (e.g., application 110) on the computing system 100. Examples of an operating system include Berkeley Software Distribution™ (BSD), developed and distributed by the Computer Systems Research Group (CSRG) of the University of California, Berkeley, or descendants thereof; Linux developed and distributed under the GNU Project; Mac OS® developed and distributed by Apple Inc.; Microsoft Windows® developed and distributed by Microsoft Corporation; and UNIX™ developed and distributed by AT&T. The interrupt-reducing operating system 112 is configured to execute on the processing system 104.

In a first example implementation, the interrupt-reducing operating system 112 receives information from the application 110. The information indicates that buffers 108 are to be used to buffer data. The information further indicates a triggering buffer that is selected from the buffers 108 and that will trigger an interrupt from the hardware 106. The interrupt is configured to request more data from the interrupt-reducing operating system 112. The interrupt-reducing operating system 112 stores portions of the data in the respective buffers 108. The interrupt-reducing operating system 112 provides a schedule for processing the buffers 108 to the hardware 106. The schedule indicates that the interrupt is to be delayed until the triggering buffer is processed by the hardware 106. The interrupt-reducing operating system 112 receives the interrupt from the hardware 106 based at least in part on (e.g., in response to or as a result of) the triggering buffer being processed by the hardware 106. The interrupt-reducing operating system 112 performs an action based at least in part on receipt of the interrupt.

In a second example implementation, the interrupt-reducing operating system 112 configures a network interface controller to provide one interrupt to the interrupt-reducing operating system 112 for each of multiple subsets of network packets that is processed by the network interface controller. In embodiments, the hardware 106 includes the network interface controller. The network packets are associated with a common network socket. A network socket is a context that refers to a logical network connection on a computer. For instance, the network socket may be associated with an IP address and a port number. Each subset of the network packets includes a designated number of the network packets. The designated number is greater than one. Each interrupt is configured to request more of the network packets from the interrupt-reducing operating system 112. The interrupt-reducing operating system 112 receives the interrupt from the network interface controller for each subset of the network packets that is processed by the network interface controller. The interrupt-reducing operating system 112 performs an action based at least in part on (e.g., in response to or as a result of) receipt of a designated interrupt from the network interface controller.

Any one or more of the components shown in FIG. 1 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

Figure 2:
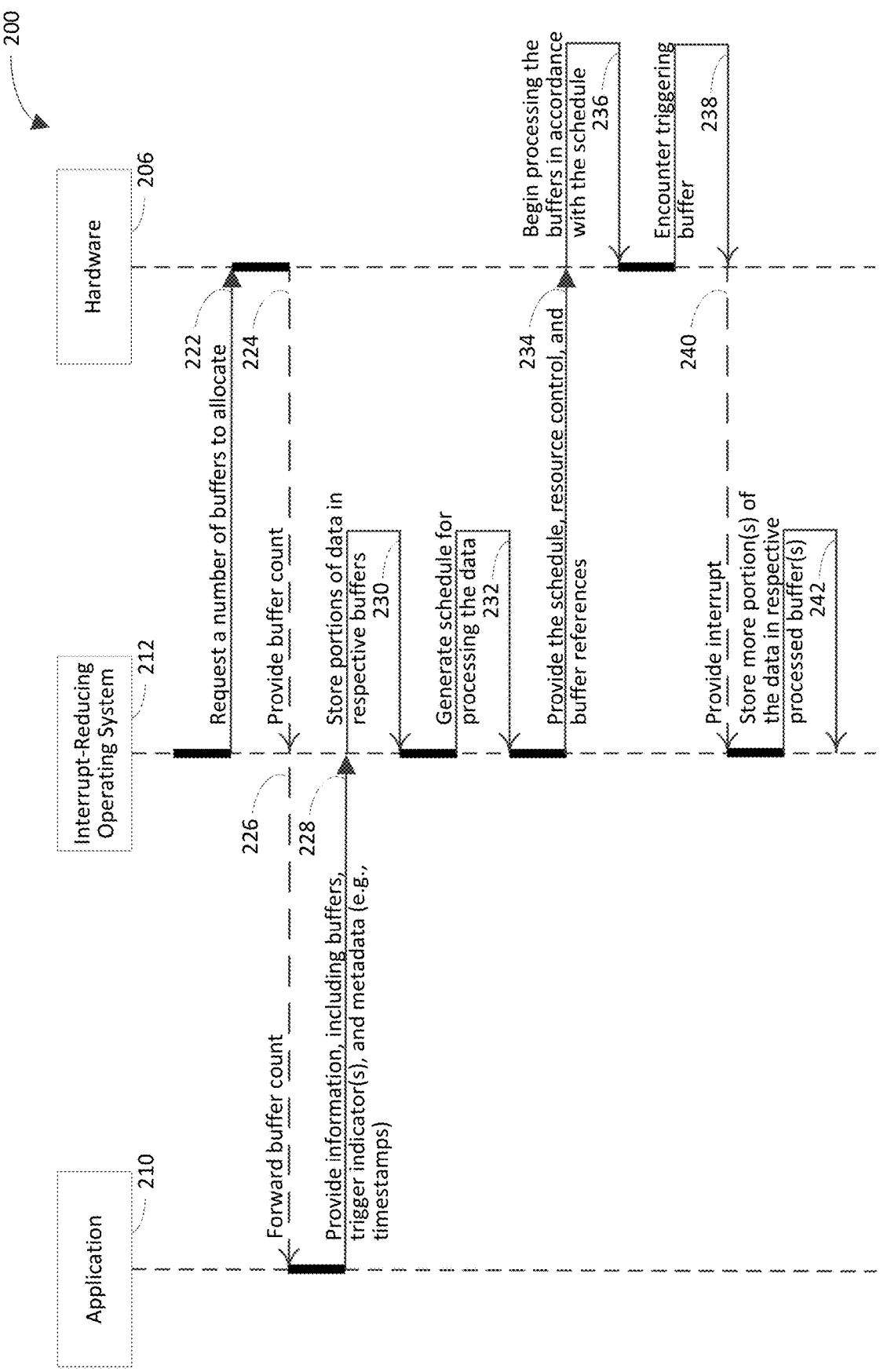
FIG. 2 is an example activity diagram for reducing interrupts using buffering for data processing in accordance with an embodiment.

FIG. 2 is an example activity diagram 200 for reducing interrupts using buffering for data processing in accordance with an embodiment. FIG. 2 depicts an application 210, an interrupt-reducing operating system 212, and hardware 206. Activities 222, 224, 226, 228, 230, 232, 234 236, 238, 240, and 242 will now be described with reference to the application 210, the interrupt-reducing operating system 212, and the hardware 206.

In activity 222, the interrupt-reducing operating system 212 requests a number of buffers that are to be allocated to the hardware 206.

In activity 224, the hardware 206 provides a buffer count, which indicates the number of buffers that the hardware 206 seeks to be allocated.

In activity 226, the interrupt-reducing operating system 212 forwards the buffer count to the application 210.

In activity 228, the application provides information, including buffers, trigger indicator(s), and metadata to the interrupt-reducing operating system 212. The number of buffers in the information provided by the application 210 may be the same as the number indicated by the buffer count or different from the number indicated by the buffer count. The application 210 may determine the number of buffers to be included in the information based on any of a variety of factors, including the buffer count and attributes of the computing system in which the application 210 executes. For instance, the application 210 may attempt to provide the number of buffers indicated by the buffer count, so long as allocation of that many buffers to the hardware 206 does not negatively impact performance of other hardware of the computing system. Each trigger indicator specifies a respective triggering buffer of the buffers. Each triggering buffer is configured to cause the hardware 206 to issue an interrupt to the interrupt-reducing operating system 212 as a result of the respective triggering buffer being processed by the hardware 206. In embodiments, the metadata includes timestamps, indicating time instances at which the respective buffers are to be processed by the hardware, deadlines by which processing of the buffers is to be completed, and so on.

In activity 230, the interrupt-reducing operating system 212 stores portions of data in the respective buffers.

In activity 232, the interrupt-reducing operating system 212 generates a schedule for processing the data. For instance, the schedule may indicate times at which the respective buffers are to be processed. In some embodiments, the schedule further indicates triggering buffer(s) of the buffers that are received from the application 210. For instance, the interrupt-reducing operating system 212 may analyze the trigger indicator(s) to identify the corresponding triggering buffer(s).

In activity 234, the interrupt-reducing operating system 212 provides the schedule, resource control, and buffer references to the hardware 206. The buffer references refer to the respective buffers. For instance, each buffer reference may indicate a location of the corresponding buffer in memory (e.g., local or remote memory) and a size of the buffer.

In activity 236, the hardware begins processing the buffers in accordance with the schedule 236.

In activity 238, the hardware 206 encounters (e.g., processes) a triggering buffer.

In activity 240, the hardware 206 provides an interrupt to the interrupt-reducing operating system 212 as a result of encountering the triggering buffer at step 238.

In activity 242, the interrupt-reducing operating system 212, stores more portion(s) of the data in respective processed buffer(s). For example, the interrupt-reducing operating system 212 may store a portion of the data in each buffer that has been processed by the hardware 206 since the hardware began processing the buffers at step 236. In another example, the interrupt-reducing operating system 212 stores a portion of the data in fewer than all of the buffers that have been processed by the hardware 206 since the hardware began processing the buffers at step 236.

It should be noted that activities 238, 240, and 242 may be repeated for each additional triggering buffer of the buffers.

In some example embodiments, one or more of the activities 222, 224, 226, 228, 230, 232, 234 236, 238, 240, and/or 242 of the activity diagram 200 are not performed. Moreover, activities in addition to or in lieu of the activities 222, 224, 226, 228, 230, 232, 234 236, 238, 240, and/or 242 may be performed.

Figure 3:
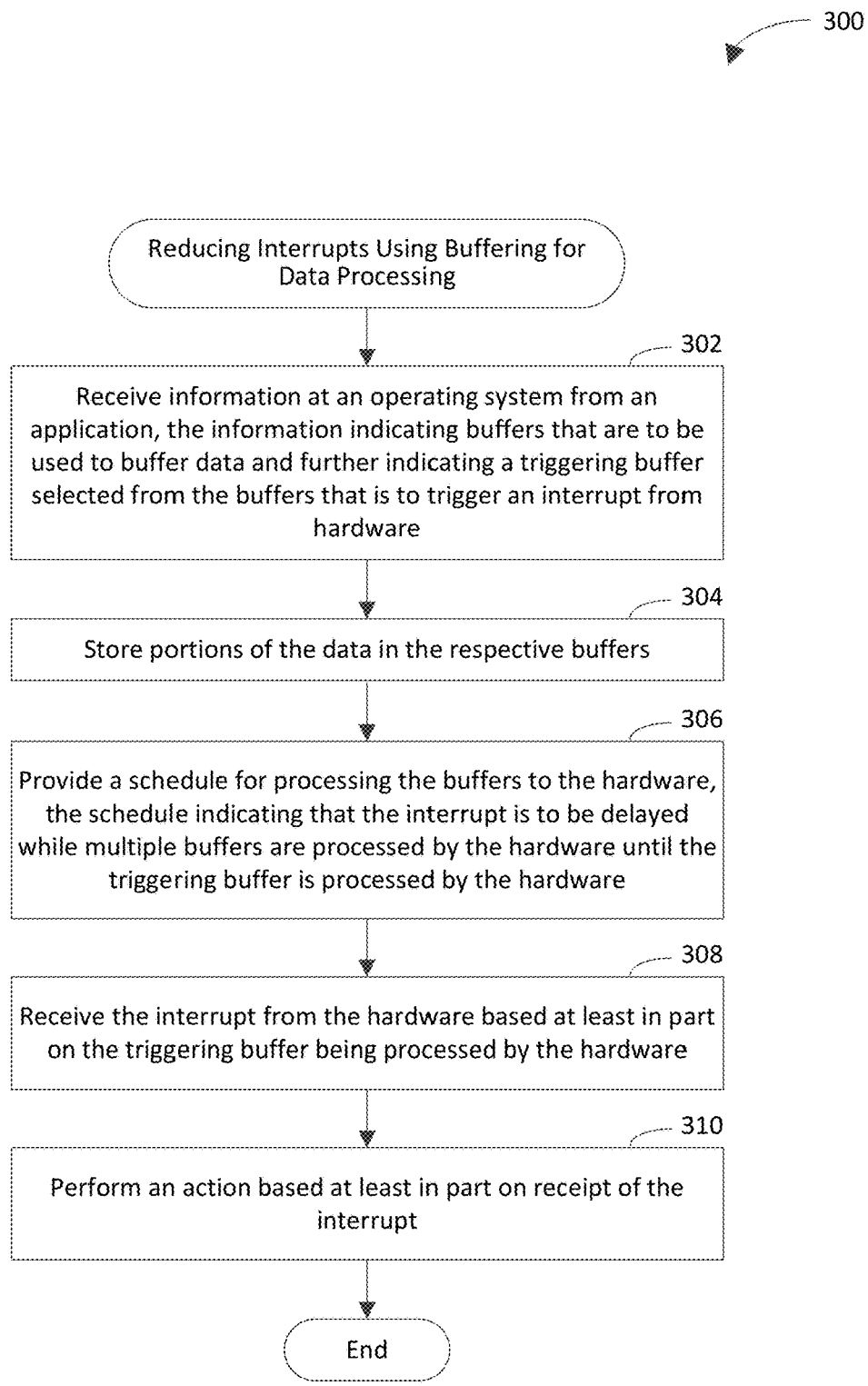
FIG. 3 depicts a flowchart of an example method for reducing interrupts using buffering for data processing in accordance with an embodiment.
Figure 4:
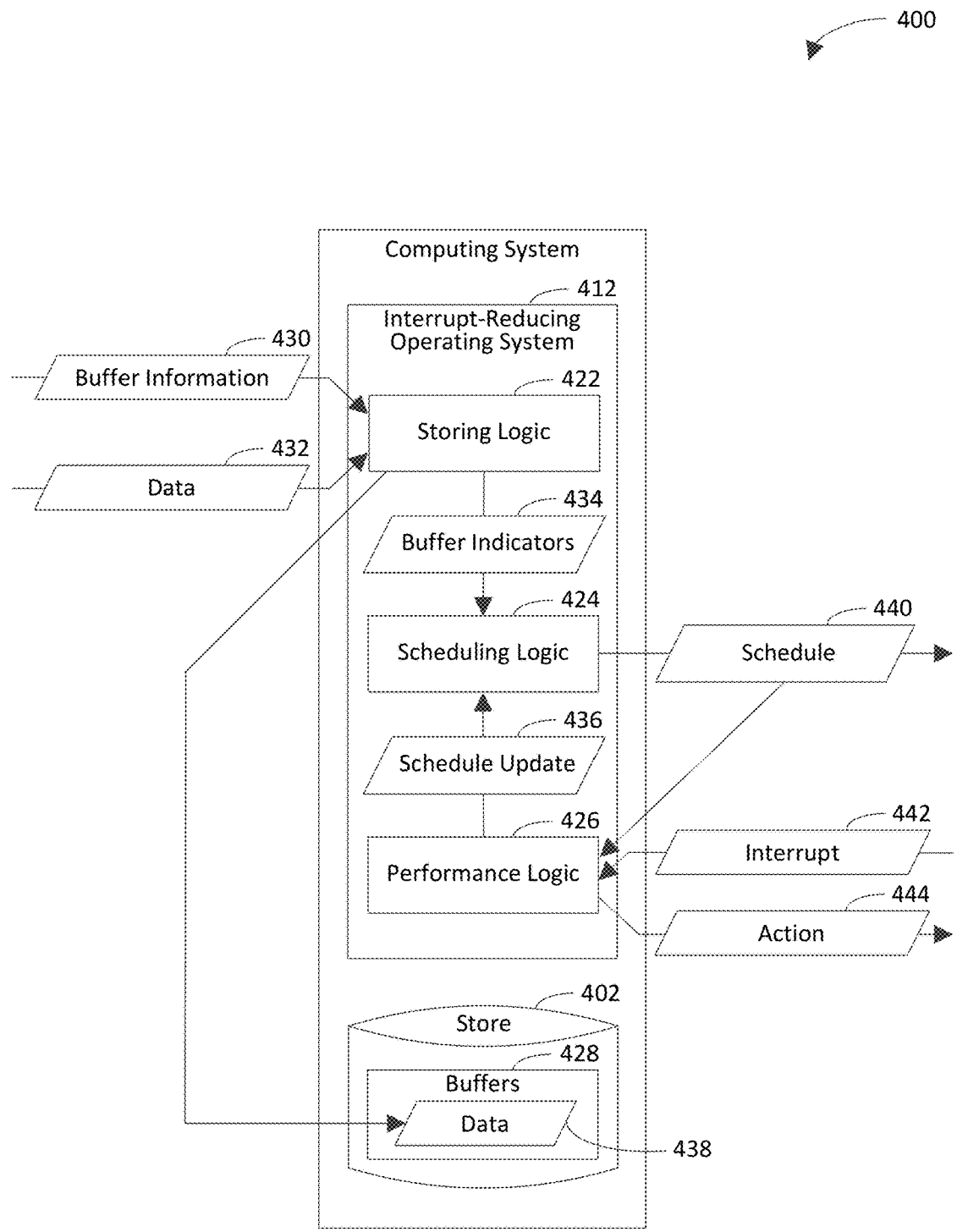
FIG. 4 is a block diagram of an example implementation of a computing system shown in FIG. 1 in accordance with an embodiment.

FIG. 3 depicts a flowchart 300 of an example method for reducing interrupts using buffering for data processing in accordance with an embodiment. Flowchart 300 may be performed by the computing system 100 shown in FIG. 1, for example. For illustrative purposes, flowchart 300 is described with respect to a computing system 400 shown in FIG. 4, which is an example implementation of the computing system 100. As shown in FIG. 4, the computing system 400 includes interrupt-reducing operating system 412 and a store 402. The interrupt-reducing operating system 412 includes storage logic 422, scheduling logic 424, and performance logic 426. The store 402 may be any suitable type of store. One type of store is a database. For instance, the store 402 may be a relational database, an entity-relationship database, an object database, an object relational database, an extensible markup language (XML) database, etc. The store 402 is shown to include buffers 428, which store data 438, for illustrative purposes. Further structural and operational embodiments will be apparent to persons skilled in the relevant art(s) based on the discussion regarding flowchart 300.

As shown in FIG. 3, the method of flowchart 300 begins at step 302. In step 302, information is received at an operating system from an application. The information indicates buffers that are to be used to buffer data. In embodiments, each buffer is a portion of memory (e.g., local or remote memory) corresponding to a respective range of memory addresses. The information further indicates a triggering buffer selected from the buffers that is to trigger an interrupt from hardware. The interrupt is configured to request more of the data from the operating system. The data may be generated by the operating system, or the data may be retrieved by the operating system from a source (e.g., network microphone or network camera) that is external to the computing device in which the operating system executes. It will be recognized that receiving the information, which indicates the triggering buffer, from the application may reduce the number of interrupts that are received by the operating system, thereby increasing an efficiency of the operating system and/or an efficiency of the computing device in which the operating system executes.

In an example implementation, the storing logic 422 receives buffer information 430 from the application. The buffer information 430 indicates the buffers 428, which are to be used to buffer the data 438, and further indicates which of the buffers 428 is the triggering buffer. The triggering buffer is to trigger an interrupt 442 from the hardware. In accordance with this implementation, the interrupt 442 is configured to request more of the data 438 from the interrupt-reducing operating system 412. The storing logic 422 may generate buffer indicators 434, identifying the buffers 428 and indicating which of the buffers 428 is the triggering buffer.

At step 304, portions of the data are stored in the respective buffers. In an example implementation, the storage logic 422 stores portions of the data 438 in the respective buffers 428.

At step 306, a schedule for processing the buffers is provided to the hardware. The schedule indicates that the interrupt is to be delayed while multiple buffers are processed by the hardware until the triggering buffer is processed by the hardware. Accordingly, the schedule may be configured to enable the multiple buffers, including the triggering buffer, to be processed before the interrupt is generated while ensuring that not all of the buffers are processed before the operating system provides more of the data to the buffers. Delaying issuance of the interrupt provides more time during which the operating system need not necessarily wake up. The schedule may include location indicators, which specify locations in memory at which the buffers are located. Providing the schedule, which indicates that the interrupt is to be delayed as described above, to the hardware may reduce the number of interrupts that are received by the operating system, thereby increasing the efficiency of the operating system and/or the efficiency of the computing system in which the operating system executes. Providing the schedule, which indicates that the interrupt is to be delayed as described above, to the hardware may also reduce an amount of power that is consumed by the operating system and/or may increase a battery life of the computing system in which the operating system executes, especially with regard to media consumption.

In an example implementation, the scheduling logic 424 provides a schedule 440 for processing the buffers 428 to the hardware. The schedule 440 indicates that the interrupt 442 is to be delayed until the triggering buffer is processed by the hardware. In some embodiments, the scheduling logic 424 configures the schedule 440 to indicate a time at which each of the buffers 428 is to be processed by the hardware. Accordingly, the schedule 440 may indicate an order in which the buffers 428 are to be processed. The scheduling logic 424 may flag the triggering buffer in the schedule 440 based on (e.g., based at least in part on) the buffer indicators 434 indicating which of the buffers 428 is the triggering buffer. In embodiments, flagging the triggering buffer in the schedule 440 includes scheduling the interrupt 442 to be issued at completion of processing of the triggering buffer.

In an example embodiment, the schedule indicates that the interrupt is to be delayed until the triggering buffer is processed by the hardware based at least in part on (e.g., in response to or as a result of) a predetermined amount of time. The predetermined amount of time is an amount of time that is (e.g., will be) consumed to process filled buffers of the buffers that remain when processing of the triggering buffer by the hardware is completed. Each filled buffer includes a respective portion of the data that has not been processed by the hardware. For instance, each of the filled buffers may have a known size (e.g., number of bits), and the amount of time that will be consumed to process each filled buffer may be determined based on the known size. In embodiments, by adding the amounts of time for the respective filled buffers, the amount of time that is to be consumed to process the filled buffers is determined in advance of the filled buffers being processed. The operating system may take this predetermined amount of time into consideration when determining which of the buffers is to be the triggering buffer. For instance, the triggering buffer may be chosen based on the predetermined amount of time enabling the operating system to remain in a sleep mode (or enabling the operating system to perform other work) while leaving sufficient time for the operating system to avoid underflow of the buffers (e.g., to avoid all of the buffers being processed and leaving the hardware with no data to process for a period of time).

In another example embodiment, the schedule indicates that the interrupt is to be provided by the hardware to the operating system at a time instance at which a number of filled buffers of the buffers is equal to a reference number that is greater than zero and less than an upper threshold. Each filled buffer includes a respective portion of the data that has not been processed by the hardware. The upper threshold is equal to a total number of the buffers minus one.

At step 308, the interrupt is received from the hardware based at least in part on (e.g., in response to or as a result of) the triggering buffer being processed by the hardware. In an example implementation, the performance logic 426 receives the interrupt 442 from the hardware as a result of the triggering buffer being processed by the hardware.

At step 310, an action is performed based at least in part on (e.g., in response to or as a result of) receipt of the interrupt. For instance, a deferred procedure call may be executed to perform the action. A deferred procedure call is an operating system mechanism that enables high-priority tasks (e.g., an interrupt handler) to defer required but lower-priority tasks for later execution. In an example implementation, the performance logic 426 performs an action 444 based at least in part on receipt of the interrupt 442.

In an example embodiment, performing the action at step 310 includes checking status of second buffers, which are associated with second hardware and which are configured to buffer second data, to determine buffer(s) that have been processed by the second hardware. The second hardware is different from the hardware from which the interrupt is received. In embodiments, the second hardware and the hardware that processes the triggering buffer are a same type. In other embodiments, the hardware that processes the triggering buffer is a first type, and the second hardware is a second type that is different from the first type. Example types of hardware include a video display; video decoding, encoding, and/or processing hardware; audio capture hardware; audio playback hardware; camera capture hardware; CPU core execution hardware (e.g., a timer, a CPU processor); and network packet send and receive hardware (e.g., a network interface controller). In embodiments, at least a portion (e.g., all) of the data associated with the buffers and at least a portion of the second data associated with the second buffers are from a common source. In embodiments, the data associated with the buffers is from a first source, and the second data associated with the second buffers is from a second source that is different from the first source. The second buffers include the buffer(s) that have been processed by the second hardware. In accordance with this embodiment, performing the action at step 310 further includes storing portion(s) of the second data in the respective buffer(s) that have been processed by the second hardware. For instance, storing the portion(s) of the second data may include topping off the buffer(s) that have been processed by the second hardware.

In another example embodiment, performing the action at step 310 includes causing the hardware and other hardware to perform actions during a common time period by updating the schedule to change a time instance at which a designated buffer in the buffers is to be processed. For instance, the schedule may be updated to postpone processing of the designated buffer.

In yet another example embodiment, performing the action at step 310 includes changing a speed at which the hardware processes the buffers. In some embodiments, changing the speed includes reducing the speed. In other embodiments, changing the speed includes increasing the speed. The speed may be based at least in part on (e.g., in response to or as a result of) attribute(s) of the computing system in which the operating system executes. Examples of an attribute of the computing system include but a proportion of resources of the computing system (e.g., processor cycles, memory, operating system bandwidth, and/or network bandwidth) that are consumed.

In still another example embodiment, performing the action at step 310 includes delegating processing of at least one of the buffers to other hardware In another example embodiment, performing the action at step 310 includes delegating scheduling of processing of at least a portion of the data to another operating system. For instance, the operating system may delegate the scheduling based at least in part on (e.g., in response to or as a result of) a speed at which at least the portion of the data is to be processed being greater than or equal to a speed threshold.

In some example embodiments, one or more steps 302, 304, 306, 308, and/or 310 of flowchart 300 may not be performed. Moreover, steps in addition to or in lieu of steps 302, 304, 306, 308, and/or 310 may be performed. For instance, in an example embodiment, the method of flowchart 300 further includes changing a state of the operating system from an active state to a sleep state for a time period that is based at least in part on (e.g., in response to or as a result of) a predetermined period of time between a first time instance at which the hardware is scheduled to start processing the buffers and a second time instance at which the triggering buffer is processed by the hardware. The active state causes the operating system to monitor interrupts from the hardware. The sleep state causes the operating system to ignore (e.g., not monitor) interrupts from the hardware. For instance, changing the state of the operating system from the active state to the sleep state may cause at least a portion of the hardware to turn off for the time period.

In an example implementation, the performance logic 426 changes a state of the interrupt-reducing operating system 412 from the active state to the sleep state for the time period. In embodiments of this implementation, the performance logic 426 analyzes the schedule 440 to determine the first time instance at which the hardware is scheduled to start processing the buffers 428 and to determine the second time instance at which the triggering buffer is to be processed by the hardware. The performance logic 426 may compare the first time instance and the second time (e.g., subtract the first time instance from the second time instance) instance to determine the predetermined period of time. Based on the predetermined period of time, the performance logic 426 may choose the time period to allow the operating system to remain in the sleep state for as long as possible during the predetermined period of time while ensuring that the operating system is awake for a sufficient amount of time during the predetermined period of time to enable the operating system to perform other work.

In another example embodiment, the method of flowchart 300 further includes causing the hardware and other hardware to perform actions during a common time period that is included in a predetermined period of time between a first time instance at which the hardware is scheduled to start processing the buffers and a second time instance at which the triggering buffer is processed by the hardware. In embodiments, the hardware and the other hardware are caused to perform the actions during the common time period based at least in part on (e.g., in response to or as a result of) the schedule indicating that the interrupt is to be delayed until the triggering buffer is processed by the hardware. In some embodiments, causing the hardware and the other hardware to perform the actions during the common time period is based at least in part on a first priority of the data that is to be processed by the hardware and a second priority of data that is to be processed by the other hardware being greater than or equal to a priority threshold (e.g., greater than a priority of other data). For instance, the data that is to be processed by the hardware and the data that is to be processed by the other hardware may be audio data, and the other data may be video data. Causing the hardware and the other hardware to perform the actions during the common time period may increase efficiency of the operating system and/or increase utilization of available memory. In an example implementation, the performance logic 426 causes the hardware and the other hardware to perform the actions during the common time period. For instance, the performance logic 426 may cause the hardware and the other hardware to perform the actions at the same time or in a common pattern within the common time period.

In yet another example embodiment, the method of flowchart 300 further includes changing (e.g., increasing or decreasing) a speed at which the hardware operates during a predetermined period of time between a first time instance at which the hardware is scheduled to start processing the buffers and a second time instance at which the triggering buffer is processed by the hardware. For instance, the speed may be based at least in part on attribute(s) of the computing system in which the operating system executes. In embodiments, the speed is changed based at least in part on (e.g., in response to or as a result of) the schedule indicating that the interrupt is to be delayed until the triggering buffer is processed by the hardware. In an example implementation, the performance logic 426 changes the speed at which the hardware operates during the predetermined period of time. For example, the performance logic 426 may set the speed to be as low as possible while enabling the hardware to process the data 438 within the times frames established in the schedule 440.

In still another example embodiment, the method of flowchart 300 further includes causing other hardware to perform actions during a predetermined period of time between a first time instance at which the hardware is scheduled to start processing the buffers and a second time instance at which the triggering buffer is processed by the hardware. In embodiments, the other hardware is caused to perform the actions during the predetermined period of time based at least in part on (e.g., in response to or as a result of) the schedule indicating that the interrupt is to be delayed until the triggering buffer is processed by the hardware. In an example implementation, the performance logic 426 causes the other hardware to perform the actions during the predetermined period of time. For instance, by causing the other hardware to perform the action during the predetermined period of time, the performance logic 426 may increase efficiency of the interrupt-reducing operating system 412 and/or reduce power consumption of the interrupt-reducing operating system 412.

In an example embodiment, performing the action at step 310 includes storing second portion(s) of the data in respective buffer(s) of the buffers. For example, a designated number of buffers may have been processed by the hardware. In accordance with this example, storing the second portion(s) of the data may include storing the designated number of portions of the data in the designated number of respective buffers. For instance, storing the second portion(s) of the data in the respective buffer(s) may include topping off the buffer(s).

In an aspect of this embodiment, storage of the second portion(s) of the data in the respective buffer(s) is delayed for a designated amount of time that begins at a time instance that corresponds to receipt of the interrupt (e.g., a time instance at which the interrupt is received).

In another aspect of this embodiment, storing the second portion(s) of the data in the respective buffer(s) includes, during a first time period (e.g., at a first time instance), storing a first subset of the second portion(s) of the data in a first subset of the respective buffer(s) that have been processed by the hardware. In accordance with this aspect, storing the second portion(s) of the data in the respective buffer(s) includes, during a second time period that follows the first time period (e.g., at a second time instance that follows the first time instance), storing a second subset of the second portion(s) of the data in a second subset of the respective buffer(s) that have been processed by the hardware.

In yet another aspect of this embodiment, the method of flowchart 300 further includes changing a state of the operating system from an active state to a sleep state based at least in part on (e.g., in response to or as a result of) the second portion(s) of the data being stored in the respective buffer(s) that have been processed by the hardware. The active state causes the operating system to monitor interrupts from the hardware. The sleep state causes the operating system to not monitor interrupts from the hardware. For instance, changing the state of the operating system from the active state to the sleep state may cause at least a portion of the hardware to turn off. In an example implementation, the performance logic 426 changes the state of the interrupt-reducing operating system 412 from the active state to the sleep state.

In another example embodiment, the method of flowchart 300 further includes determining a speed at which the hardware processes at least a subset of the buffers. The subset of the buffers includes at least one of the buffers. For example, the performance logic 426 may determine the speed at which the hardware processes at least the subset of the buffers 428. In accordance with this example, the performance logic 426 may analyze the schedule 440 to determine the speed. In accordance with this embodiment, the method of flowchart 300 further includes selecting the action to be performed from multiple actions based at least in part on (e.g., in response to or as a result of) the speed at which the hardware processes at least the subset of the buffers.

In yet another example embodiment, the method of flowchart 300 further includes, at a first time instance, selecting a first buffer from the buffers to be the triggering buffer. In an example implementation, the scheduling logic 424 selects the first buffer from the buffers 428 to be the triggering buffer at the first time instance. In accordance with this embodiment, the method of flowchart 300 further includes, at a second time instance that follows the first time instance, selecting a second buffer from the buffers to be the triggering buffer such that the second buffer replaces the first buffer as the triggering buffer. The second buffer is different from the first buffer. In an example implementation, the scheduling logic 424 selects the second buffer from the buffers 428 to be the triggering buffer at the second time instance. For instance, the second buffer replacing the first buffer as the triggering buffer may change an amount of time that is to be consumed to process filled buffers that remain at a time instance at which processing of the triggering buffer by the hardware is completed. It will be recognized that the filled buffers are included in the buffers 428.

In still another example embodiment, the method of flowchart 300 further includes removing at least one buffer from the buffers that are to be used to buffer the data. For instance, the performance logic 426 may remove at least one buffer from the buffers 428 that are to be used to buffer the data 438. In accordance with this embodiment, the method of flowchart 300 further includes changing the schedule to accommodate removal of the at least one buffer from the buffers. For example, the scheduling logic 424 may change the schedule 440 to accommodate the removal of the at least one buffer from the buffers 428. In accordance with this example, the performance logic may generate a schedule update 436 to indicate that the at least one buffer has been removed from the buffers 428. In further accordance with this example, the scheduling logic 424 may change the schedule 440 to accommodate the removal of the at least one buffer from the buffers 428 based on the schedule update 436 indicating that the at least one buffer has been removed from the buffers 428.

It will be recognized that the computing system 400 may not include one or more of the store 402, the interrupt-reducing operating system 412, the storage logic 422, the scheduling logic 424, and/or the performance logic 426. Furthermore, the computing system 400 may include components in addition to or in lieu of the store 402, the interrupt-reducing operating system 412, the storage logic 422, the scheduling logic 424, and/or the performance logic 426.

Figure 5:
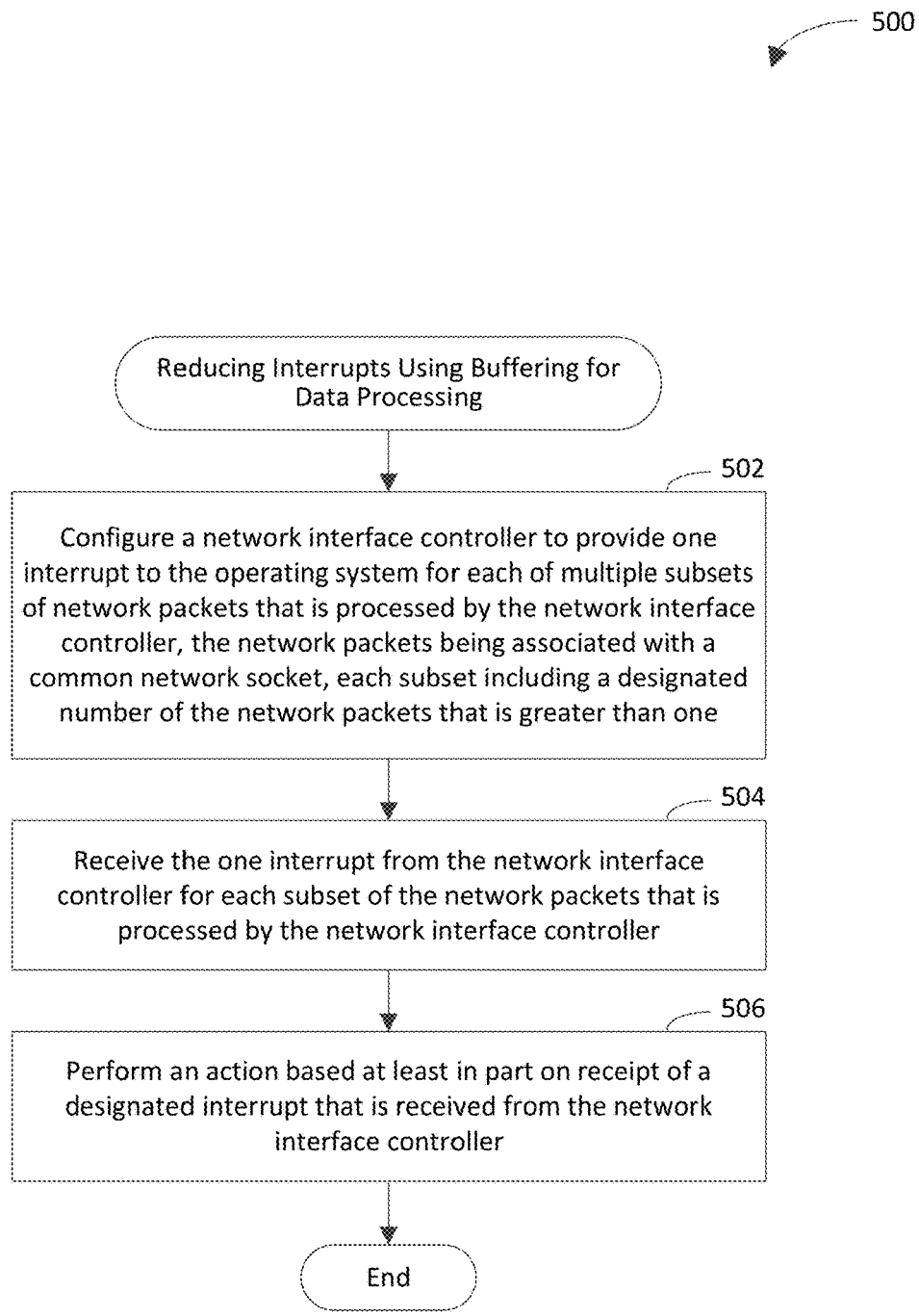
FIG. 5 depicts a flowchart of another example method for reducing interrupts using buffering for data processing in accordance with an embodiment.
Figure 6:
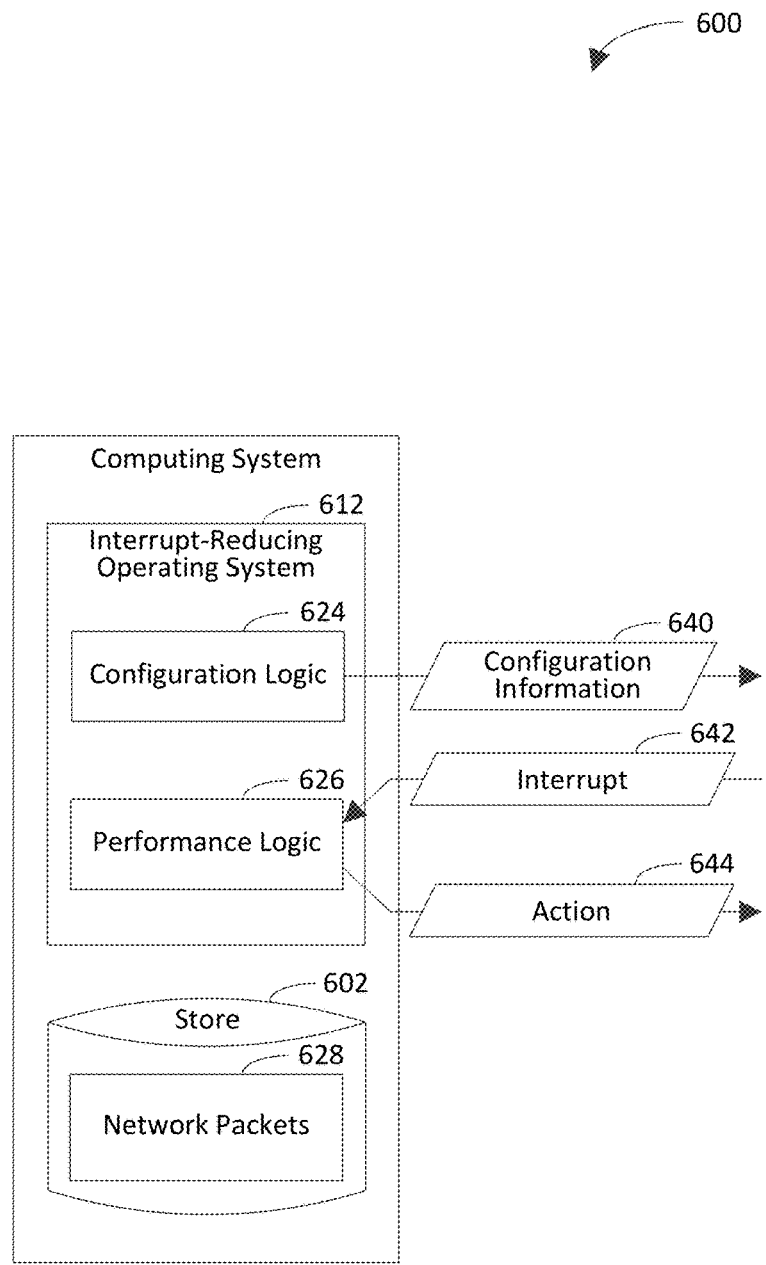
FIG. 6 is a block diagram of another example implementation of a computing system shown in FIG. 1 in accordance with an embodiment.

FIG. 5 depicts a flowchart 500 of another example method for reducing interrupts using buffering for data processing in accordance with an embodiment. Flowchart 500 may be performed by the computing system 100 shown in FIG. 1, for example. For illustrative purposes, flowchart 500 is described with respect to a computing system 600 shown in FIG. 6, which is an example implementation of the computing system 100. As shown in FIG. 6, the computing system 600 includes interrupt-reducing operating system 612 and a store 602. The interrupt-reducing operating system 612 includes configuration logic 624 and performance logic 626. The store 602 may be any suitable type of store. One type of store is a database. For instance, the store 602 may be a relational database, an entity-relationship database, an object database, an object relational database, an extensible markup language (XML) database, etc. The store 602 is shown to include network packets 628 for illustrative purposes. Further structural and operational embodiments will be apparent to persons skilled in the relevant art(s) based on the discussion regarding flowchart 500.

As shown in FIG. 5, the method of flowchart 500 begins at step 502. In step 502, a network interface controller is configured to provide one interrupt to the operating system for each of multiple subsets of network packets that is processed by the network interface controller. The network packets are associated with a common (e.g., same) network socket. A network socket is a context that refers to a logical network connection on a computer. For instance, the network socket may be associated with an IP address and a port number. Each subset of the network packets includes a designated number of the network packets. The designated number is greater than one. For instance, the designated number may be 2, 3, 4, 6, or 8. Each interrupt is configured to request more of the network packets from the operating system. In an example implementation, the configuration logic 624 configures the network interface controller to provide one interrupt to the interrupt-reducing operating system 612 for each of the multiple subsets of the network packets 628 that is processed by the network interface controller. The network packets 628 are associated with the common network socket. The configuration logic 624 may generate configuration information 640, which includes instructions and/or settings for configuration of the network interface controller. The common network socket may be shared by multiple applications that execute on the computing system 600.

In an example embodiment, configuring the network interface at step 502 includes providing a schedule for processing the network packets to the network interface controller. In accordance with this embodiment, the schedule indicates that the network interface controller is to provide the one interrupt to the operating system for each subset of the network packets that is processed by the network interface controller. For instance, the configuration information 640 may include the schedule.

At step 504, receiving the one interrupt from the network interface controller for each subset of the network packets that is processed by the network interface controller. In an example implementation, the performance logic 626 receives the one interrupt from the network interface controller for each subset of the network packets 628 that is processed by the network interface controller.

At step 506, an action is performed based at least in part on (e.g., in response to or as a result of) receipt of a designated interrupt from the network interface controller. For instance, a deferred procedure call may be executed to perform the action. In an example implementation, the performance logic 626 performs an action 644 based at least in part on receipt of an interrupt 642 from the network interface controller. It will be recognized that the action performed at step 506 may include any one or more of the example actions described above with regard to step 310 of flowchart 300. It will be further recognized that references to hardware in the discussion of flowchart 300 are applicable to the network interface controller mentioned herein with reference to flowchart 500.

In an example embodiment, performing the action at step 506 includes changing a state of the operating system from an active state to a sleep state for a period of time that is based at least in part on (e.g., in response to or as a result of) an amount of time consumed by the network interface controller to process the designated number of the network packets. The active state causes the operating system to monitor interrupts from the network interface controller. The sleep state causes the operating system to not monitor interrupts from the network interface controller. In an example implementation, the performance logic 626 changes the state of the interrupt-reducing operating system 612 from the active state to the sleep state for the period of time.

In some example embodiments, one or more steps 502, 504, and/or 506 of flowchart 500 are not performed. Moreover, steps in addition to or in lieu of steps 502, 504, and/or 506 may be performed.

It will be recognized that the computing system 600 may not include one or more of the store 602, the interrupt-reducing operating system 612, the configuration logic 624, and/or the performance logic 626. Furthermore, the computing system 600 may include components in addition to or in lieu of the store 602, the interrupt-reducing operating system 612, the configuration logic 624, and/or the performance logic 626.

Figure 7:
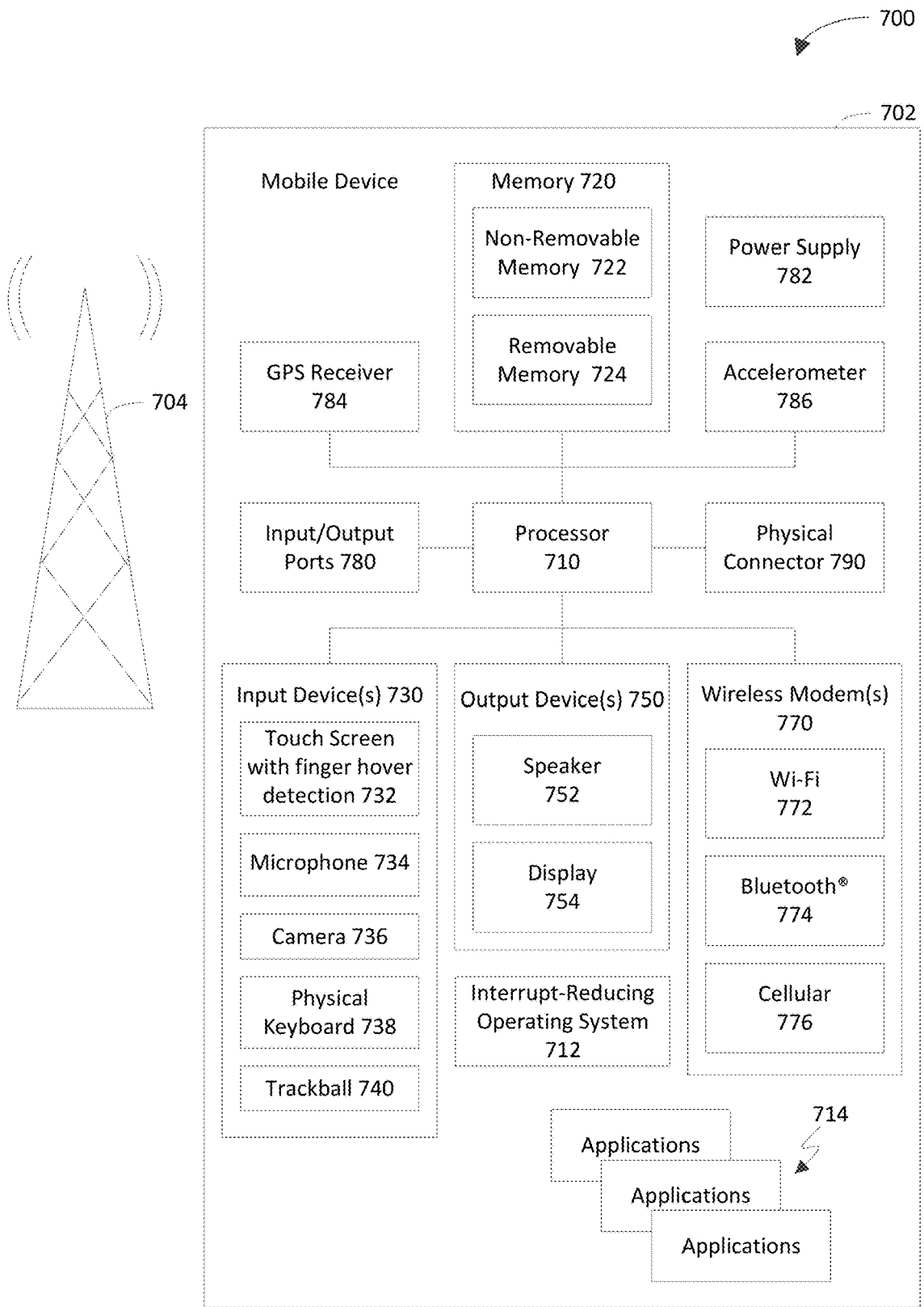
FIG. 7 is a system diagram of an exemplary mobile device in accordance with an embodiment.

FIG. 7 is a system diagram of an exemplary mobile device 700 including a variety of optional hardware and software components, shown generally as 702. Any components 702 in the mobile device may communicate with any other component, though not all connections are shown, for ease of illustration. The mobile device 700 may be any of a variety of computing devices (e.g., cell phone, smartphone, handheld computer, Personal Digital Assistant (PDA), etc.) and may allow wireless two-way communications with one or more mobile communications networks 704, such as a cellular or satellite network, or with a local area or wide area network.

The mobile device 700 may include a processor 710 (e.g., signal processor, microprocessor, ASIC, or other control and processing logic circuitry) for performing such tasks as signal coding, data processing, input/output processing, power control, and/or other functions. A interrupt-reducing operating system 712 may control the allocation and usage of the components 702 and support for one or more applications 714 (a.k.a. application programs). The interrupt-reducing operating system 712 is configured to reduce interrupts using buffering for data processing in accordance with any one or more of the techniques described herein. The applications 714 may include common mobile computing applications (e.g., email applications, calendars, contact managers, web browsers, messaging applications) and any other computing applications (e.g., word processing applications, mapping applications, media player applications).

The mobile device 700 may include memory 720. The memory 720 may include non-removable memory 722 and/or removable memory 724. The non-removable memory 722 may include random access memory (RAM), read-only memory (ROM), flash memory, a hard disk, or other well-known memory storage technologies. The removable memory 724 may include flash memory or a Subscriber Identity Module (SIM) card, which is well known in Global System for Mobile Communications (GSM) systems, or other well-known memory storage technologies, such as "smart cards." The memory 720 may store data and/or code for running the interrupt-reducing operating system 712 and the applications 714. Example data may include web pages, text, images, sound files, video data, or other data sets to be sent to and/or received from one or more network servers or other devices via one or more wired or wireless networks. Memory 720 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 700 may support one or more input devices 730, such as a touch screen 732, microphone 734, camera 736, physical keyboard 738 and/or trackball 740 and one or more output devices 750, such as a speaker 752 and a display 754. Touch screens, such as the touch screen 732, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 732 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 732 and display 754 may be combined in a single input/output device. The input devices 730 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the interrupt-reducing operating system 712 or applications 714 may include speech-recognition software as part of a voice control interface that allows a user to operate the mobile device 700 via voice commands. Furthermore, the mobile device 700 may include input devices and software that allows for user interaction via a user's spatial gestures, such as detecting and interpreting gestures to provide input to a gaming application.

Wireless modem(s) 770 may be coupled to antenna(s) (not shown) and may support two-way communications between the processor 710 and external devices, as is well understood in the art. The modem(s) 770 are shown generically and may include a cellular modem 776 for communicating with the mobile communication network 704 and/or other radio-based modems (e.g., Bluetooth® 774 and/or Wi-Fi 772). At least one of the wireless modem(s) 770 is typically configured for communication with one or more cellular networks, such as a GSM network for data and voice communications within a single cellular network, between cellular networks, or between the mobile device and a public switched telephone network (PSTN).

The mobile device may further include at least one input/output port 780, a power supply 782, a satellite navigation system receiver 784, such as a Global Positioning System (GPS) receiver, an accelerometer 786, and/or a physical connector 790, which may be a universal serial bus (USB) port, IEEE 1394 (FireWire) port, and/or RS-232 port.

The illustrated components 702 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the interrupt-reducing operating system 112, the interrupt-reducing operating system 212, the interrupt-reducing operating system 412, the storage logic 422, the scheduling logic 424, the performance logic 426, the interrupt-reducing operating system 612, the configuration logic 624, the performance logic 626, the interrupt-reducing operating system 712, activity diagram 200, flowchart 300, and/or flowchart 500 may be implemented in hardware, software, firmware, or any combination thereof.

For example, any one or more of the interrupt-reducing operating system 112, the interrupt-reducing operating system 212, the interrupt-reducing operating system 412, the storage logic 422, the scheduling logic 424, the performance logic 426, the interrupt-reducing operating system 612, the configuration logic 624, the performance logic 626, the interrupt-reducing operating system 712, activity diagram 200, flowchart 300, and/or flowchart 500 may be implemented, at least in part, as computer program code configured to be executed in one or more processors.

In another example, any one or more of the interrupt-reducing operating system 112, the interrupt-reducing operating system 212, the interrupt-reducing operating system 412, the storage logic 422, the scheduling logic 424, the performance logic 426, the interrupt-reducing operating system 612, the configuration logic 624, the performance logic 626, the interrupt-reducing operating system 712, activity diagram 200, flowchart 300, and/or flowchart 500 may be implemented, at least in part, as hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
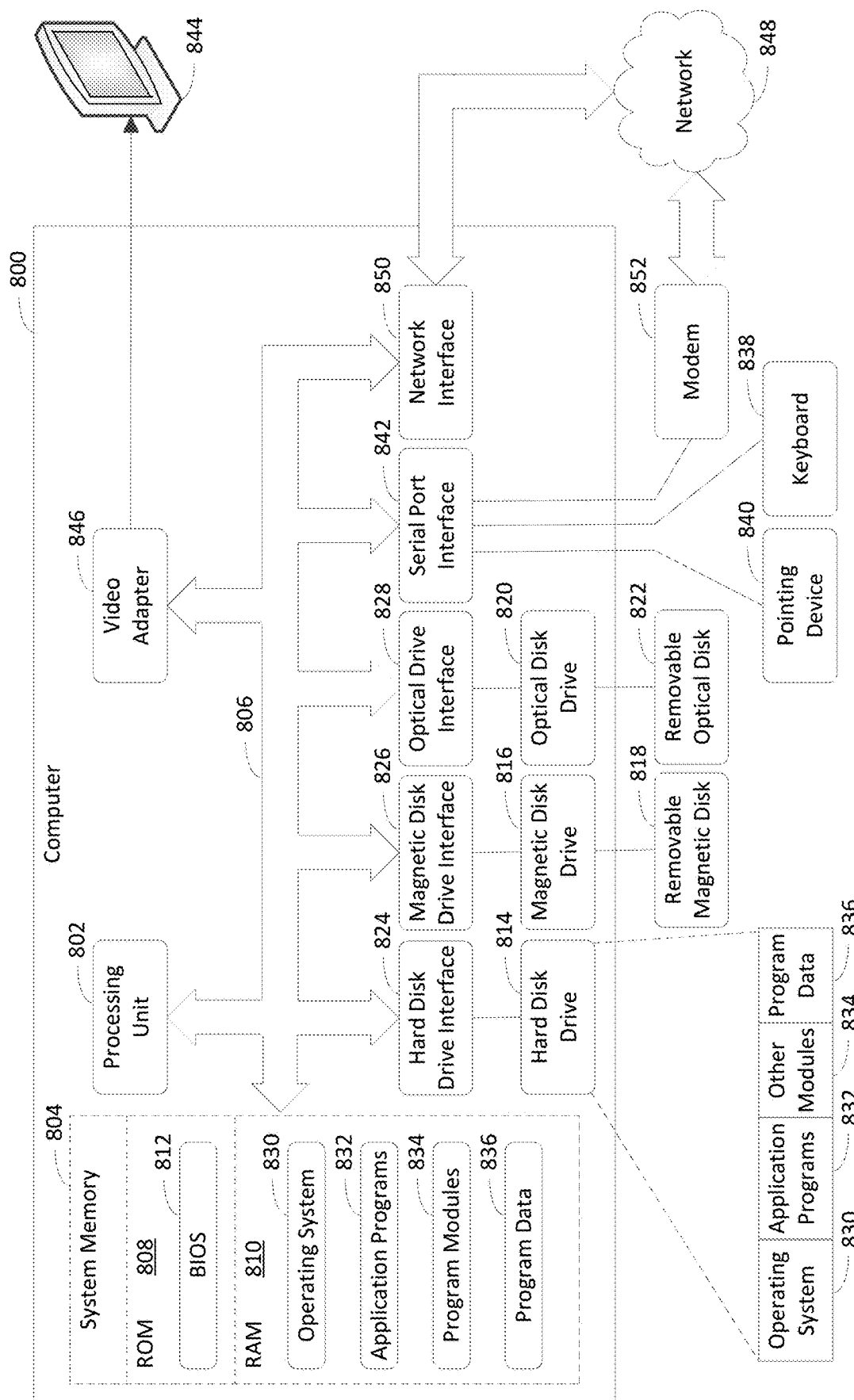
FIG. 8 depicts an example computer in which embodiments may be implemented.

III. Further Discussion of Some Example Embodiments (A1) An example system (FIG. 1, 100; FIG. 4, 400; FIG. 7, 702; FIG. 8, 800) comprises a memory (FIG. 7, 720; FIG. 8, 804, 808, 810) configured to store an operating system (FIG. 1, 112; FIG. 2, 212; FIG. 4, 412; FIG. 7, 712; FIG. 8, 830) and a processing system (FIG. 7, 710; FIG. 8, 802) coupled to the memory. The processing system is configured to execute the operating system. The operating system is configured to, when executed, perform the following operations: receive (FIG. 3, 302) information from an application (FIG. 1, 110; FIG. 2, 210; FIG. 7, 714; FIG. 8, 832), the information indicating a plurality of buffers (FIG. 1, 108; FIG. 4, 428) that are to be used to buffer data (FIG. 4, 438; FIG. 8, 836) and further indicating a triggering buffer selected from the plurality of buffers, the triggering buffer configured to trigger an interrupt (FIG. 4, 442) from hardware (FIG. 1, 106; FIG. 2, 206), the interrupt configured to request more of the data from the operating system; store (FIG. 3, 304) a plurality of portions of the data in the plurality of buffers, respectively; provide (FIG. 3, 306) a schedule (FIG. 4, 440) for processing the plurality of buffers to the hardware, the schedule indicating that the interrupt is to be delayed while multiple buffers are processed by the hardware until the triggering buffer is processed by the hardware; receive (FIG. 3, 308) the interrupt from the hardware based at least in part on the triggering buffer being processed by the hardware; and perform (FIG. 3, 310) an action (FIG. 4, 444) based at least in part on receipt of the interrupt.

(A2) In the example system of A1, wherein the operating system is further configured to, when executed, perform the following operation: change a state of the operating system from an active state to a sleep state for a time period that is based at least in part on a predetermined period of time between a first time instance at which the hardware is scheduled to start processing the plurality of buffers and a second time instance at which the triggering buffer is processed by the hardware; wherein the active state causes the operating system to monitor interrupts from the hardware; and wherein the sleep state causes the operating system to ignore interrupts from the hardware.

(A3) In the example system of any of A1-A2, wherein the operating system is further configured to, when executed, perform the following operation: cause a portion of the hardware to turn off for the time period by changing the state of the operating system from the active state to the sleep state.

(A4) In the example system of any of A1-A3, wherein the operating system is further configured to, when executed, perform the following operation: cause the hardware and other hardware to perform actions during a common time period between a first time instance at which the hardware is scheduled to start processing the plurality of buffers and a second time instance at which the triggering buffer is processed by the hardware.

(A5) In the example system of any of A1-A4, wherein the operating system is further configured to, when executed, perform the following operation: change a speed at which the hardware operates during a predetermined period of time between a first time instance at which the hardware is scheduled to start processing the plurality of buffers and a second time instance at which the triggering buffer is processed by the hardware.

(A6) In the example system of any of A1-A5, wherein the operating system is further configured to, when executed, perform the following operation: based at least in part on the schedule indicating that the interrupt is to be delayed until the triggering buffer is processed by the hardware, cause other hardware to perform actions during a predetermined period of time between a first time instance at which the hardware is scheduled to start processing the plurality of buffers and a second time instance at which the triggering buffer is processed by the hardware.

(A7) In the example system of any of A1-A6, wherein the action is performed storing a second portion of the data in a first particular buffer that has been processed by the hardware, the first particular buffer being included in the plurality of buffers.

(A8) In the example system of any of A1-A7, wherein the second portion of the data is stored during a first time period, and wherein the action is performed by storing a third portion of the data in a second particular buffer that has been processed by the hardware.

(A9) In the example system of any of A1-A8, wherein the action is performed by: determining a subset of buffers that have been processed by the second hardware by checking a status of a second plurality of buffers, which are associated with second hardware and which are configured to buffer second data, wherein the second hardware is different from the hardware from which the interrupt is received, wherein the second plurality of buffers includes the subset of buffers that have been processed by the second hardware; and storing portions of the second data in respective buffers of the subset of buffers that have been processed by the second hardware.

(A10) In the example system of any of A1-A9, wherein the action is performed by causing the hardware and other hardware to perform actions during a common time period by updating the schedule to change a time instance at which a designated buffer of the plurality of buffers is to be processed.

(A11) In the example system of any of A1-A10, wherein the action is performed by changing a speed at which the hardware processes the plurality of buffers.

(A12) In the example system of any of A1-A11, wherein the action is performed by delegating processing of a buffer of the plurality of buffers to other hardware.

(A13) In the example system of any of A1-A12, wherein the operating system is further configured to, when executed, perform the following operations: determine a speed at which the hardware processes a subset of the plurality of buffers; and select the action to be performed from a plurality of actions based at least in part on the speed at which the hardware processes the subset of the plurality of buffers.

(A14) In the example system of any of A1-A13, wherein the operating system is further configured to, when executed, perform the following operations: at a first time instance, select a first buffer from the plurality of buffers to be the triggering buffer; and at a second time instance that follows the first time instance, replacing the first buffer with a second buffer from the plurality of buffers as the triggering buffer, the second buffer being different from the first buffer.

(A15) In the example system of any of A1-A14, wherein the operating system is further configured to, when executed, perform the following operations: remove a particular buffer from the plurality of buffers that are to be used to buffer the data; and change the schedule to accommodate removal of the particular buffer from the plurality of buffers.

(A16) In the example system of any of A1-A15, wherein the action is performed by delegating scheduling of processing of at least a portion of the data to another operating system.

(B1) An example method, which is implemented by an operating system (FIG. 1, 112; FIG. 2, 212; FIG. 6, 612; FIG. 7, 712; FIG. 8, 830) that executes on a processing system (FIG. 7, 710; FIG. 8, 802) of a computing system (FIG. 1, 100; FIG. 6, 600; FIG. 7, 702; FIG. 8, 800), comprises configuring (FIG. 5, 502) a network interface controller (FIG. 8, 850) to provide one interrupt to the operating system for each of a plurality of subsets of a plurality of network packets (FIG. 6, 628) that is processed by the network interface controller. The plurality of network packets is associated with a common network socket. Each of the plurality of subsets includes a designated number of the plurality of network packets. The designated number is greater than one. Each interrupt is configured to request more network packets of the plurality of network packets from the operating system. The method further comprises receiving (FIG. 5, 504) the one interrupt from the network interface controller for each of the plurality of subsets of the plurality of network packets that is processed by the network interface controller. The method further comprises performing (FIG. 5, 506) an action (FIG. 6, 644) based at least in part on receipt of a designated interrupt from the network interface controller (B2) In the method of B1, wherein configuring the network interface comprises: providing a schedule for processing the plurality of network packets to the network interface controller, the schedule indicating that the network interface controller is to provide the one interrupt to the operating system for each of the plurality of subsets of the plurality of network packets that is processed by the network interface controller.

(B3) In the method of any of B1-B2, wherein performing the action comprises: changing a state of the operating system from an active state to a sleep state for a period of time that is based at least in part on an amount of time consumed by the network interface controller to process the designated number of the plurality of network packets; wherein the active state causes the operating system to monitor interrupts from the network interface controller; and wherein the sleep state causes the operating system to ignore interrupts from the network interface controller.

(C1) An example computer program product (FIG. 7, 724; FIG. 8, 818, 822) comprising a computer-readable storage medium having instructions recorded thereon for enabling a processor-based system (FIG. 1, 100; FIG. 4, 400; FIG. 7, 702; FIG. 8, 800) to perform operations. The operations comprise receiving (FIG. 3, 302) information from an application (FIG. 1, 110; FIG. 2, 210; FIG. 7, 714; FIG. 8, 832). The information indicates a plurality of buffers (FIG. 1, 108; FIG. 4, 428) that are to be used to buffer data (FIG. 4, 438; FIG. 8, 836) and further indicates a triggering buffer selected from the plurality of buffers that is to trigger an interrupt (FIG. 4, 442) from hardware (FIG. 1, 106; FIG. 2, 206). The interrupt is configured to request more of the data from an operating system. The operations further comprise storing (FIG. 3, 304) a plurality of portions of the data in the plurality of respective buffers. The operations further comprise providing (FIG. 3, 306) a schedule (FIG. 4, 440) for processing the plurality of buffers to the hardware. The schedule indicates that the interrupt is to be delayed while multiple buffers are processed by the hardware until the triggering buffer is processed by the hardware. The operations further comprise receiving (FIG. 3, 308) the interrupt from the hardware based at least in part on the triggering buffer being processed by the hardware. The operations further comprise performing (FIG. 3, 310) an action (FIG. 4, 444) based at least in part on receipt of the interrupt.

(D1) An example method, which is implemented by an operating system (FIG. 1, 112; FIG. 2, 212; FIG. 4, 412; FIG. 7, 712; FIG. 8, 830) that executes on a processing system (FIG. 7, 710; FIG. 8, 802) of a computing system (FIG. 1, 100; FIG. 4, 400; FIG. 7, 702; FIG. 8, 800), comprises receiving (FIG. 3, 302) information from an application (FIG. 1, 110; FIG. 2, 210; FIG. 7, 714; FIG. 8, 832), the information indicating a plurality of buffers (FIG. 1, 108; FIG. 4, 428) that are to be used to buffer data (FIG.

4, 438; FIG. 8, 836) and further indicating a triggering buffer selected from the plurality of buffers, the triggering buffer configured to trigger an interrupt (FIG. 4, 442) from hardware (FIG. 1, 106; FIG. 2, 206), the interrupt configured to request more of the data from the operating system. The method further comprises storing (FIG. 3, 304) a plurality of portions of the data in the plurality of buffers, respectively. The method further comprises providing (FIG. 3, 306) a schedule (FIG. 4, 440) for processing the plurality of buffers to the hardware, the schedule indicating that the interrupt is to be delayed while multiple buffers are processed by the hardware until the triggering buffer is processed by the hardware. The method further comprises receiving (FIG. 3, 308) the interrupt from the hardware based at least in part on the triggering buffer being processed by the hardware. The method further comprises storing (FIG. 3, 310) more data in the multiple buffers based at least in part on receipt of the interrupt.

IV. Example Computer System

FIG. 8 depicts an example computer 800 in which embodiments may be implemented. Any one or more of the computing system 100 shown in FIG. 1, the computing system 400 shown in FIG. 4, and/or the computing system 600 shown in FIG. 6 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes ROM 808 and RAM 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, RAM, ROM, and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the interrupt-reducing operating system 112, the interrupt-reducing operating system 212, the interrupt-reducing operating system 412, the storage logic 422, the scheduling logic 424, the performance logic 426, the interrupt-reducing operating system 612, the configuration logic 624, the performance logic 626, the interrupt-reducing operating system 712, activity diagram 200 (including any activity of activity diagram 200), flowchart 300 (including any step of flowchart 300), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a USB.

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, RAM, ROM, and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, radio frequency (RF), infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

It will be recognized that the computer 800 may include other components, including an audio mic/jack, an audio DSP, a camera DSP, and camera inputs. Such components may be configured to issue interrupts to the operating system 830 in accordance with any one or more of the example techniques described herein.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory configured to store an operating system; and
   a processing system coupled to the memory, the processing system configured to execute the operating system, the operating system configured to, when executed, perform the following operations:
      receive information from an application, the information indicating a plurality of buffers that are to be used to buffer data and further indicating a triggering buffer selected from the plurality of buffers, the triggering buffer configured to trigger an interrupt from hardware, the interrupt configured to request more of the data from the operating system;
      store a plurality of portions of the data in the plurality of buffers, respectively;
      provide a schedule for processing the plurality of buffers to the hardware, the schedule indicating that the interrupt is to be delayed while multiple buffers are processed by the hardware until the triggering buffer is processed by the hardware, wherein delay of the interrupt reduces a number of interrupts that are received by the operating system;
      receive the interrupt from the hardware based at least in part on the triggering buffer being processed by the hardware; and
      perform an action based at least in part on receipt of the interrupt.

2. The system of claim 1, wherein the operating system is further configured to, when executed, perform the following operation:
   change a state of the operating system from an active state to a sleep state for a time period that is based at least in part on a predetermined period of time between a first time instance at which the hardware is scheduled to start processing the plurality of buffers and a second time instance at which the triggering buffer is processed by the hardware;
   wherein the active state causes the operating system to monitor interrupts from the hardware; and
   wherein the sleep state causes the operating system to ignore interrupts from the hardware.

3. The system of claim 2, wherein the operating system is further configured to, when executed, perform the following operation:
   cause a portion of the hardware to turn off for the time period by changing the state of the operating system from the active state to the sleep state.

4. The system of claim 1, wherein the operating system is further configured to, when executed, perform the following operation:
   cause the hardware and other hardware to perform actions during a common time period between a first time instance at which the hardware is scheduled to start processing the plurality of buffers and a second time instance at which the triggering buffer is processed by the hardware.

5. The system of claim 1, wherein the operating system is further configured to, when executed, perform the following operation:
   change a speed at which the hardware operates during a predetermined period of time between a first time instance at which the hardware is scheduled to start processing the plurality of buffers and a second time instance at which the triggering buffer is processed by the hardware.

6. The system of claim 1, wherein the operating system is further configured to, when executed, perform the following operation:
   based at least in part on the schedule indicating that the interrupt is to be delayed until the triggering buffer is processed by the hardware, cause other hardware to perform actions during a predetermined period of time between a first time instance at which the hardware is scheduled to start processing the plurality of buffers and a second time instance at which the triggering buffer is processed by the hardware.

7. The system of claim 1, wherein the action is performed by storing a second portion of the data in a first particular buffer that has been processed by the hardware, the first particular buffer being included in the plurality of buffers.

8. The system of claim 7, wherein the second portion of the data is stored during a first time period, and wherein the action is performed by storing a third portion of the data in a second particular buffer that has been processed by the hardware.

9. The system of claim 1, wherein the action is performed by:
   determining a subset of buffers that have been processed by second hardware by checking a status of a second plurality of buffers, which are associated with the second hardware and which are configured to buffer second data, wherein the second hardware is different from the hardware from which the interrupt is received, wherein the second plurality of buffers includes the subset of buffers that have been processed by the second hardware; and
   storing portions of the second data in respective buffers of the subset of buffers that have been processed by the second hardware.

10. The system of claim 1, wherein the action is performed by causing the hardware and other hardware to perform actions during a common time period by updating the schedule to change a time instance at which a designated buffer of the plurality of buffers is to be processed.

11. The system of claim 1, wherein the action is performed by changing a speed at which the hardware processes the plurality of buffers.

12. The method of claim 1, wherein the action is performed by delegating processing of a buffer of the plurality of buffers to other hardware.

13. The system of claim 1, wherein the operating system is further configured to, when executed, perform the following operations:
   determine a speed at which the hardware processes a subset of the plurality of buffers; and
   select the action to be performed from a plurality of actions based at least in part on the speed at which the hardware processes the subset of the plurality of buffers.

14. The system of claim 1, wherein the operating system is further configured to, when executed, perform the following operations:
   at a first time instance, select a first buffer from the plurality of buffers to be the triggering buffer; and
   at a second time instance that follows the first time instance, replacing the first buffer with a second buffer from the plurality of buffers as the triggering buffer, the second buffer being different from the first buffer.

15. The system of claim 1, wherein the operating system is further configured to, when executed, perform the following operations:
   remove a particular buffer from the plurality of buffers that are to be used to buffer the data; and
   change the schedule to accommodate removal of the particular buffer from the plurality of buffers.

16. The system of claim 1, wherein the action is performed by delegating scheduling of processing of a portion of the data to another operating system.

17. A method, which is implemented by an operating system that executes on a processing system of a computing system, comprising:
   configuring a network interface controller to provide one interrupt to the operating system for each of a plurality of subsets of a plurality of network packets that is processed by the network interface controller, the plurality of network packets being associated with a common network socket, each of the plurality of subsets including a designated number of the plurality of network packets, the designated number being greater than one, each interrupt configured to request more network packets of the plurality of network packets from the operating system;
   receiving the one interrupt from the network interface controller for each of the plurality of subsets of the plurality of network packets that is processed by the network interface controller; and
   performing an action based at least in part on receipt of a designated interrupt from the network interface controller, wherein performing the action comprises:
      changing a state of the operating system from an active state to a sleep state for a period of time that is based at least in part on an amount of time consumed by the network interface controller to process the designated number of the plurality of network packets;
   wherein the active state causes the operating system to monitor interrupts from the network interface controller; and
   wherein the sleep state causes the operating system to ignore interrupts from the network interface controller.

18. The method of claim 17, wherein configuring the network interface comprises:
   providing a schedule for processing the plurality of network packets to the network interface controller, the schedule indicating that the network interface controller is to provide the one interrupt to the operating system for each of the plurality of subsets of the plurality of network packets that is processed by the network interface controller.

19. A method, which is implemented by an operating system that executes on a processing system of a computing system, comprising:
   receiving information from an application, the information indicating a plurality of buffers that are to be used to buffer data and further indicating a triggering buffer selected from the plurality of buffers, the triggering buffer configured to trigger an interrupt from hardware, the interrupt configured to request more of the data from the operating system;
   storing a plurality of portions of the data in the plurality of buffers, respectively;
   providing a schedule for processing the plurality of buffers to the hardware, the schedule indicating that the interrupt is to be delayed while multiple buffers are processed by the hardware until the triggering buffer is processed by the hardware, wherein delay of the interrupt reduces a number of interrupts that are received by the operating system;
   receiving the interrupt from the hardware based at least in part on the triggering buffer being processed by the hardware; and
   storing more data in the multiple buffers based at least in part on receipt of the interrupt.

20. The method of claim 19, further comprising at least one of the following operations based at least in part on receipt of the interrupt:
   causing the hardware and other hardware to perform actions during a common time period by updating the schedule to change a time instance at which a designated buffer of the plurality of buffers is to be processed;
   changing a speed at which the hardware processes the plurality of buffers;
   delegating processing of a buffer of the plurality of buffers to other hardware; or
   delegating scheduling of processing of a portion of the data to another operating system.

* * * * *